United States Patent [19]

Kent et al.

[11] Patent Number: 5,380,477
[45] Date of Patent: Jan. 10, 1995

[54] PROCESS OF MAKING FIBER REINFORCED LAMINATES

[75] Inventors: George M. Kent, Arden; Otto M. Ilg, Asheville; Matthew B. Hoyt, Arden, all of N.C.

[73] Assignee: BASF Corporation, Parsippany, N.J.

[21] Appl. No.: 66,806

[22] Filed: May 25, 1993

[51] Int. Cl.$^6$ .............. D01D 5/12; D01F 8/04; D02J 1/22
[52] U.S. Cl. .................. 264/103; 264/171; 264/210.8; 264/211.12; 264/211.17
[58] Field of Search ............... 264/103, 171, 176.1, 264/210.8, 211.12, 211.17

[56] References Cited

U.S. PATENT DOCUMENTS

| | | |
|---|---|---|
| 3,692,423 | 9/1972 | Okamoto et al. . |
| 4,539,249 | 9/1985 | Curzio . |
| 4,814,032 | 3/1989 | Taniguchi et al. ............ 264/103 X |
| 4,818,318 | 4/1989 | McMahon et al. . |
| 4,871,491 | 10/1989 | McMahon et al. . |
| 4,874,563 | 10/1989 | McMahon et al. . |
| 5,000,807 | 3/1991 | Stuart . |
| 5,106,552 | 4/1992 | Goi et al. ................ 264/103 |
| 5,162,074 | 11/1992 | Hills . |
| 5,177,840 | 1/1993 | Laws . |
| 5,187,018 | 2/1993 | Glemet . |
| 5,190,809 | 3/1993 | Marissen et al. . |

FOREIGN PATENT DOCUMENTS 0156599 10/1985 European Pat. Off. .

OTHER PUBLICATIONS

Cziollek, Jr., "New Yarns for Thermoplastic Technical Textiles and Composites", *Technische Textilien/Technical Textiles*, vol. 35, Oct. 1992, pp. E106–E107. (English).

Cziollek, Jr., "Neue Garne für thermopolastische Verbundtextilien und Composites", *Technische Textilien*, 35, Jahrgang, Oktober 1992, pp. T124–T126. (German).

*Primary Examiner*—Leo B. Tentoni
*Attorney, Agent, or Firm*—Karen M. Dellerman

[57] ABSTRACT

Fabric useful for processing into a fiber reinforced composite is made from multicomponent yarn having a thermoplastic matrix component of a first melting point if crystalline or a first softening point if not crystalline and a drawable, oriented, fibrous thermoplastic reinforcing component of a second melting point if crystalline or a second softening point if not crystalline, wherein said first melting or softening point is at least 5° C. below said second melting or softening point.

16 Claims, No Drawings

PROCESS OF MAKING FIBER REINFORCED LAMINATES

FIELD OF THE INVENTION

This invention relates generally to reinforced composite items and processes for making them. More specifically, this invention relates to reinforced composite articles made substantially completely from thermoplastic materials.

BACKGROUND OF THE INVENTION

As used herein, the term "fiber" includes fibers of extreme or indefinite length ("filaments") and fibers of short length ("staple"). The term "fabric" denotes a two, or possibly three, dimensional product built up from fibers. These fibers may occur in the fabric unidirectionally, bi-directionally with different warp and woof ratios or tri-directionally. The terms "mixed fiber" or "mixed fibers" refer to yarns composed of two or more different types of fibers. The terms "multicomponent fiber" or "multicomponent fibers" refer to fibers having two or more longitudinally coextensive components. The terms "multicomponent yarn" or "multicomponent yarns" refer to either mixed fiber yarns, multicomponent fibers, or mixtures of them.

Fiber reinforced products are known. Such products make possible the manufacture of advanced thermoplastic composite parts in very complex shapes. The traditional composites take the form of a thermoplastic matrix reinforced by non-thermoplastic fibers, such as graphite, glass, ceramics and similar fibers. These materials may be found in many "high-tech" applications such as for aircraft components and recreational equipment.

U.S. Pat. No. 4,539,249 ("'249") describes laminates of graphite, glass, aramides, ceramics, quartz, boron, SiC, etc., and resinous thermoplastic fibers which are intended for conversion into a composite. To make the pre-consolation form, resinous thermoplastic fibers are combined or blended with the reinforcing fibers to form a single yarn. The blended yarn is then woven into a fabric that is shaped to a suitable form in a mold and then heated to melt the thermoplastic component. Also described is a process for spinning staple resin fibers with graphite to form the yarn which is then woven into the fabric, shaped and heated. Fabrics formed by interweaving the graphite in the resin fibers by conventional weaving techniques is also disclosed.

U.S. Pat. Nos. 4,874,563 ("'563"), 4,818,318 ("'318"), and 4,871,491 ("'491") describe methods of forming fiber reinforced composites by forming a tape or fabric prepreg especially of carbon fiber tows intermixed with thermoplastic matrix fibers. Also described is a process involving the extrusion of carbon fiber tapes impregnated with high melting thermoplastic polymers. These patents acknowledge that prepregs formed by forming composites from carbon fibers which are coated or painted with thermosetting matrix materials are stiff and can not be draped across intricately shaped molds or are tacky and difficult to handle. The patents disclose attempts to overcome the shortcomings of such former processes by intermixing tows of carbon fibers and thermoplastic polymeric fibers. The processes for such intermixing are disclosed. '318 discloses intermixing two tows where one tow is a thermoplastic matrix material and the other tow is a reinforcing material that is preferably carbon fiber but may be a sufficiently high melting thermoplastic. '491 and '563 also describe an intermixing method.

U.S. Pat. Nos. 5,000,807 ("'807") and 5,177,840 ("'840") both disclose additional methods of commingling or combining thermoplastic matrix and, preferably, non-thermoplastic reinforcing fibers. The reinforcing fibers may be aromatic polyamides.

Cziollek, J., "New Yarns for Thermoplastic Technical Textiles and Composites", *Technische Textilien/Technical Textiles*, Vol. 35, October 1992, pp. E106–E107 describes attempts to develop a 100% thermoplastic composite material in which both the reinforcing fiber and the matrix polymer are thermoplastics. This article describes theoretical methods of making such a composite yarn but does not sufficiently describe the matrix polymer or any specific combination of thermoplastic reinforcing fiber with a matrix polymer. The discussion is primarily directed to development of a reinforcing fiber and is not enabling for a complete composite fabric.

U.S. Pat. No. 5,190,809 ("'809") discloses a fabric of continuous thermoplastic matrix filaments and continuous reinforcing filaments suited for being processed as a thermoplastic composite prepreg. In one variation of the fabric, both the reinforcing filament and the matrix filament are thermoplastics. Even in the case where both the reinforcing and matrix filaments are thermoplastic, '809 teaches that each type of filament is supplied as a discrete bundle or monofilament.

A problem inherent in combining two or more thermoplastic materials is the incompatibility of the separate materials. For reinforced composite applications, it is essential that the matrix polymer completely coat or "wet out" the reinforcing fiber. Air pockets that remain in the final product seriously reduce its strength. One manner of easing the problem of insufficient wet out is by adding a size, i.e., a wetting agent or water soluble polymer, to the matrix polymer to improve the wet out of the reinforcing polymer.

U.S. Pat. No. 5,187,018 discloses the use of a compatibilizer to promote wetting of the reinforcing fiber by the matrix thermoplastic. The reinforcing fiber and the compatibilizer may be co-extruded.

SUMMARY OF THE INVENTION

Accordingly, one embodiment of the present invention is the use of a fabric suitable for being processed into a fiber reinforced composite. The fabric is made from a multicomponent fiber having a thermoplastic matrix component of a first melting point if crystalline or a first softening point if not crystalline and a drawable, fibrous thermoplastic reinforcing component of a second melting point if crystalline or a second softening point if not crystalline. The first melting or softening point is at least 5° C. below the second melting or softening point.

Another embodiment of the present invention is the use of a fabric for conversion into a fiber reinforced laminate. The fabric is produced by co-spinning in a yarn a fibrous matrix thermoplastic component with a first melting point if crystalline or a first softening point if not crystalline, and a drawable fibrous reinforcing thermoplastic component with a second melting point if crystalline or a second softening point if not crystalline. The first melting point is at least 5° C. below the second melting point. The co-spun yarn is fabricated into a fabric.

A further embodiment of the present invention is a process for forming fiber reinforced laminates. The process involves extruding a multicomponent yarn having in the same threadline a fibrous matrix thermoplastic component with a first melting point if crystalline or a first softening point if not crystalline, and a drawable fibrous reinforcing thermoplastic component with a second melting point if crystalline or a second softening point if not crystalline. The first melting point is at least 5° C. below the second melting point. The yarn is fabricated into a pre-consolidation fabric. The fabric is shaped by conforming the fabric onto a mold or substrate. The shaped pre-consolidation fabric is heated to the first melting or softening point but not to the second melting or softening point such that the matrix component melts and consolidates the reinforcing component.

It is an object of the present invention to provide a predominately thermoplastic reinforced composite material wherein the matrix and reinforcing components are spun simultaneously from the same spinneret.

Related objects and advantages will be apparent to those of ordinary skill in the art after reading the following detailed description.

DESCRIPTION OF THE PREFERRED EMBODIMENTS

To promote an understanding of the principles of the present invention, descriptions of specific embodiments of the invention follow, and specific language describes the same. It will nevertheless be understood that no limitation of the scope of the invention is thereby intended, and that such alterations and further modifications, and such further applications of the principles of the invention as discussed are contemplated, as would normally occur to one ordinarily skilled in the art to which the invention pertains.

By combining the filaments during spinning, a much more uniform mixing of the reinforcing and matrix components is achieved without additional process steps, such as those required in commingling. The present invention involves the use of multicomponent yarns (either mixed fiber or multicomponent fiber) to prepare fabrics for use in making reinforced composite items. Bicomponent fibers are preferred. Bicomponent fibers place the reinforcing material in intimate contact with the matrix material, which will typically produce much stronger adhesion between the materials than found in other methods. The bicomponent spinning will allow two normally incompatible polymers to form strong materials without the use of compatibilizing agents such as those discussed in U.S. Pat. No. 5,187,018.

A first embodiment of the present invention is a fabric suitable for being processed into a fiber reinforced composite article. The fabric is composed of multicomponent fibers having one component of matrix polymer and the other component of reinforcing polymer. The components may be arranged in any arrangement, e.g., side-by-side or sheath/core or islands-in-the-sea. It should be readily apparent that the matrix component should occupy a large portion of the outer surface of the fibers to facilitate flowing and incorporate the reinforcing component in the melt without significant void formation.

The multicomponent fibers useful in the present invention may be made according to any known or later developed method for making such fibers. For example, side-by-side bicomponents may be made as shown in U.S. Pat. No. 5,162,074, incorporated herein by reference for such teaching. Sheath/core bicomponents may be made as shown in U.S. Pat. No. 5,162,074, incorporated herein by reference for such teaching. The portion of U.S. Pat. No. 3,692,423 relating to the manufacture of islands-in-the-sea fibers is hereby incorporated by reference as an example of how such fibers can be made. The multicomponent fibers are preferably continuous filaments. The sheath/core arrangement may or may not be concentric. Where the arrangement is sheath/core, the matrix component occupies the sheath. Where the arrangement is islands-in-the-sea, the matrix component occupies the sea.

The multicomponent fibers are formed by co-spinning the matrix and reinforcing components. Alternatively, multicomponent and single component fibers can be co-spun. The single component fibers may be of the matrix component, the reinforcing component or some of each component. It is also contemplated that other types of fibers may be added by co-spinning to the extent permitted by the state-of-the-art now or after future developments.

Also, it is contemplated that the multicomponent fibers may be combined with other fibers which provide other properties. For example, carbon fibers may provide conductivity and resistance to static electricity. These "functional" filaments may be added during co-spinning or by any other method such as commingling, coweaving, coknitting, cowinding, etc.

It is also contemplated that waste or scrap materials may be used as the multicomponent fiber for the present invention. For example, certain nonwoven fabrics are made from bicomponent fibers and have the desired properties for use in the fabric invention. One such fabric is a nonwoven sheet made from a nylon 6 and polyethyleneterephthalate bicomponent fiber. This fabric, after use, or scraps of it produced during manufacturing may be, for example, shredded and then used in the present invention.

The matrix component has a melting point, if crystalline, or a softening point, if not crystalline, that is at least about 5° C., and preferably more, below the melting or softening point of the reinforcing component. This allows the matrix component to melt and become the matrix portion of the composite while the reinforcing component does not melt and remains fibrous after the matrix resolidifies. It should be readily apparent to those who are ordinarily skilled in the art that the greater difference in the melting point the greater flexibility in processing the fabric made from the multicomponent fibers into a composite since the melt temperature must be less tightly controlled.

Suitable materials for the matrix component include virtually any thermoplastic materials so long as the melting point criteria is met. Of course, for application in the present invention, the thermoplastic should be fiber forming. However, this is in principle the case with virtually all thermoplastic materials of the requisite molecular weight, which will vary according to the polymer and its chemical properties. Preference is given to a crystalline or semi-crystalline thermoplastic materials. The matrix component can be selected, for instance, from polyamides (such as nylon 6; nylon 6,6; nylon 6,6T; nylon 616T; nylon 4,6; nylon 8; nylon 6,10; nylon 11; and nylon 12); polyolefins (such as polypropylene, polyethylene, polytetrafluoroethylene and polyphenylene ether); amorphous and/or crystalline polyesters (such as polyalkyleneterephthalates, polyethyleneterephthalate ("PET") and polybutyleneterephalthalate); or polyimides (such as polyetherimide, polyamideimide, polymethyl(meth)-acrylate and polyethylmethacrylate). Further polysulfones; polyphenylenesulphide; polyvinyls (such as polyvinyl-alcohol, poly-vinylacetate, ethylenevinylacetate copolymers, poly-vinylchloride, polyvinylidenechloride, copolymers of vinyl-chloride and vinylidenechloride or polyvinylidenefluoride); polyethyleneglycol; styrene-containing copolymers (such as polystyrene, polymonochlorostyrene or styreneacrylonitrile copolymers); polylactones, polyacrylonitrile; polyarylenesulphideketone, polyoxymethylene, polycarbonate, polyethers, polyetherketone, polyetherketone-ketone, polyetheretherketone, polyetherketone-etherketoneketone, polyacetals, polyacrylic acid, polyurethanes, polyarylic acid, cellulose esters, polybenzimidazole and copolymers and blends of these substances may also be used. Preferably, the matrix component is selected from the group consisting of polyolefins, polyamides, polyesters, polysulfones; polyaryletherketones; polyimides; polystyrenes; polylactones; polycarbonates; and polyethers. Preferably, the matrix component is a polyamide and, most preferably, nylon 6.

Suitable materials for the reinforcing component should be capable of drawing and orientation but generally all fiber forming thermoplastic materials are useful so long as the materials selected are such that the melting point of the reinforcing material is at least about 5° C. above the melting point of the matrix material. Suitable reinforcing components include, for example, polyolefins; polyamides, polyesters; polysulfones; polyaryletherketones; polyimides; polycarbonates; and polyethers. Preferably, the reinforcing component is a polyester and most preferably, polyethylene terephthalate.

In general, a variety of matrix to reinforcing material ratios may be used. Preferably, the final composite should be between 15 and 80 percent matrix material by weight and more preferably, 40 to 70 percent matrix material by weight. Of course, it will be understood that the optimum level of matrix material will vary with the thermoplastic materials selected as well as the intended end application.

The preferred denier per filament is ½ to 40 denier per filament, with the most preferred being 3 to 15 denier per filament.

In general, nearly any cross-section may be used to make the bicomponent fibers useful in the present invention. The fibers may be, for example, round, delta or multilobal. Round cross-sections or cross-sections with a modification ratio below 2.3 are preferred to facilitate a dense package of fiber and to minimize the opportunity to form voids when the composite is made.

To make the fabric, the multicomponent fibers are processed to form a fabric by weaving, knitting, calendaring, hot air bonding, hydroentangling, needle punching or plaiting, all according to methods known to those who are ordinarily skilled in the art. It is contemplated that chemical methods, mechanical methods or thermobonding methods may be used. The fabric may be made by wrapping or braiding the multicomponent yarn about a predetermined form.

Thermoplastic powders may be added to the fabric, when it is made. Further, one or more layers of fabric may be combined with one or more layers of sheeting or film of the same or a different thermoplastic material or of a thermosetting material depending upon the application. Additionally, fillers and conventional additives may be added to the thermoplastic materials either before they are spun to form a fabric or to the fabric or to the prepreg in the thermoforming process. These additives may be selected from, for example, pigments, fluxes or anti-blocking agents.

Another aspect of the present invention is a fabric useful for conversion into a fiber reinforced laminate which is produced by co-spinning a yarn from a matrix component and a drawable reinforcing component. The co-spinning may be by melt spinning a bicomponent fiber of the reinforcing component. The bicomponent fiber may have any structure described above. For example, with the reinforcing component in a core or matrix component in a sheath; a side-by-side arrangement; or an islands-in-the-sea arrangement. The matrix and reinforcing component are selected as described above. The fabricating may be by knitting, weaving or any other fabricating methods such as those used to make nonwovens. Suitable methods for fabricating include chemical methods, mechanical methods or thermobonding methods. Additionally, the fabric may be made by wrapping or braiding the yarn about a predetermined form.

The yarn is formed by co-spinning the matrix and reinforcing components. This co-spinning may be to produce multicomponent fibers or mixed fiber yarns. The mixed fiber yarns may have two or more separate types of homofibers, so long as one type of homofiber is the reinforcing component and another type of homofiber is the matrix component. Alternatively, multicomponent and single component fibers can be co-spun. The single component fibers may be of the matrix component, the reinforcing component or some of each component. It is also contemplated that other types of fibers may be added by co-spinning to the extent permitted by the state-of-the-art now or after future developments.

Also, it is contemplated that the co-spun yarns may be combined with other fibers which provide other properties. For example, carbon fibers may provide conductivity and resistance to static electricity. These "functional" filaments may be added during co-spinning or by any other method such as commingling, coweaving, coknitting, cowinding, etc.

As noted, the fabric may also include a monocomponent fiber which is included by incorporating with the bicomponent (or other multicomponent fiber) by co-spinning. The monocomponent fiber may be added by co-spinning as described above. It is also contemplated, as described above, that other functional fibers may be added to impart certain functions or characteristics to the fabric.

The fabrics of the present invention are particularly well suited to be stacked to form laminates which are processed as prepregs under pressure in a heated mold. This may, for instance, be an ordinary double mold or also a single mold with a vacuum bag. One advantage of the prepreg fabrics of the present invention is that they can be draped when cold. This is of particular importance in the thermoforming process when filling a mold of a complex geometry because a fabric that allows itself to be draped will conform completely to the shape of the mold.

Another embodiment of the present invention is a process for forming fiber reinforced laminates. The process involves extruding a multicomponent yarn having, in the same threadline, a fibrous matrix thermoplastic component and a fibrous reinforcing thermoplastic component. Extruding in the same threadline refers to co-spinning such that both components are spun at the same time as described previously. Various arrangements of the components, such as in a multicomponent filament, a mixed filament yarn, or combination of multicomponent and mixed filaments are possible. The materials may be selected as described above and other functional filaments may be added either during the extruding process or later by co-winding or any of the other methods described above or contemplated by those ordinarily skilled in the art.

The yarn is then fabricated into a preconsolidation fabric. The fabricating may be by any of the methods described above or contemplated by those of ordinary skill in the art, such as weaving, knitting, hydro-entangling, braiding, etc.

The fabric is then shaped into a preconsolidation form such as by, for example, placing the fabric onto a mold or substrate. Next the shaped fabric is heated at least to the melting or softening point of the matrix component but not to the melting or softening point of the reinforcing component such that the matrix component melts and flows to adopt the shape of the mold or substrate.

It is contemplated and especially preferred that several layers of the fabric are placed together prior to the shaping and heating.

When processing the fabric as a prepreg, the conventional processes can be applied. Typically the fabric is heated to a temperature at which the thermoplastic fibers will melt but not yet degrade and at which the reinforcing fibers will neither melt nor degrade. The thermoplastic fibers will generally be chosen from those thermoplastic materials that have a melting point above 100° C. and preferably above 130° C., to ensure that the mechanical properties of the product will be adequate. In order to promote the wetting of the fibers, pressure of from about 1 bar to about 100 bar will typically be exercised.

Since the invention used fabrics made from components which are already in intimate contact, the composites formed according to the present invention are substantially free from voids where the matrix has not wet out the reinforcement. This effect is enhanced when the components are co-spun uniformly such that domains of any one component are substantially avoided.

At high pressures (above 100 bar), reinforcing fibers are less inclined to form loops. High pressure processes are, then, both more difficult and expensive. The present invention is therefore particularly suited for use at processing temperatures with average to low pressures. In vacuum bag molding techniques, it is possible to obtain a proper impregnation at differential pressures of 1 to 2 bar. The quality of the impregnation depends in part upon the viscosity of the thermoplastic material applied. For instance, in view of the viscosity of nylon 6, it is preferable to employ a pressure of from about 5 bar to about 50 bar when using this material.

Fabrics made with multicomponent yarns according to the present invention can be used in all applications where the use of high-grade fiber reinforced plastics is advantageous. The product is particularly advantageous in those areas where it is desirable for flat sheets of fabric to be subjected to elastic cold forming to conform to the mold for the thermoforming process. Examples include automotive components, recreational equipment, domestic articles (e.g., boxes for microwaves), housings for electronic apparatus, satellite dishes, aircraft components, shipbuilding, home construction, furniture, vessels and helmets.

The invention will now be described by referring to the following detailed examples. These examples are set forth by way of illustration and are not intended to be limiting in scope.

EXAMPLE 1

Composite from a Knitted Fabric of a Bicomponent Yarn

The bicomponent yarn is produced by spinning sheath-core filaments through a spinneret assembly at 290° C. with the sheath comprised of nylon 6 (relative viscosity in $H_2SO_4$ of 2.8 and a moisture below 500 ppm) and the core comprised of polyethylene terephthalate (PET). The PET has an intrinsic viscosity, measured in phenoltetrachloroethane of 0.63 and a moisture below 80 ppm. The weight percentages of each are 23% sheath and 77% core. After leaving the spinneret, the filaments are quenched with air, drawn over heated godets to impart orientation and consequently increase strength. The filament bundle is then wound onto a package using a winder. The resulting yarn has a total denier of 1485 and a filament count of 110. The denier of each filament is approximately 13.5.

The yarn is knitted into a tube using a circular knitter. Tension is applied to make the knit tube as dense as possible. The fabric weight of the knit tube is 940 grams/m$^2$. Four layers of knit tubes (8 plies of fabric) are stacked together and molded in a hydraulic press at 450° F. (232° C.) and 21 bar (300 psig) pressure for 16 minutes. The resulting composite material is approximately 23% nylon 6 matrix and 77% PET reinforcing fiber.

EXAMPLE 2

Composite from a Knitted Fabric of a Bicomponent Yarn and Monocomponent Yarn

The bicomponent yarn (relative viscosity, before spinning, of 2.7 in $H_2SO_4$) is produced by the method described in Example 1. The monocomponent nylon 6 yarn is spun separately using a similar method, except typical fiber spin-draw-wind technology is utilized. The spinning temperature is 270° C. The monocomponent yarn has a total denier of 2000 and a filament count of 184. The denier of each filament is approximately 10.9.

The bicomponent and monocomponent yarns are knitted together into a tube by feeding the yarns side-by-side into the circular knitter. Tension is applied so as to make the knit tube as dense as possible. Fabric weight of the knit tube is 1540 grams/m$^2$.

Four layers of knit tube (8 plies of fabric) are stacked together and molded in a molding press at 440° F. (226.7° C.) and 7 bar (100 psig) pressure for 10 minutes. The resulting composite material is approximately 67% nylon 6 matrix and 33% PET reinforcing fiber by weight.

EXAMPLE 3

Composite from a Knitted Fabric of a Yarn Containing Bicomponent and Monocomponent Filaments The yarn is produced by the method described in Example 1, except that a special spinneret assembly is designed so that both sheath-core bicomponent filaments and monocomponent filaments could be spun simultaneously from the same spinneret. The resulting yarn has a total denier of 1485 and a filament count of 110, 82 of which are bicomponent and 28 of which are monocomponent. The monocomponent filaments are PET and the bicomponent filaments are PET core with nylon 6 sheath. The weight percentages of each polymer in the yarn was 23% nylon 6 and 77% PET.

The yarn is knitted into a tube using a circular knitter. Tension is applied so as to make the knit tube as dense as possible. Fabric weight of the knit tube is 1000 grams/m². Four layers of knit tube (8 plies of fabric) are stacked together and molded in a hydraulic press at 450° F. (232° C.) and 21 bar (300 psig) pressure for 16 minutes. The resulting composite material is approximately 23% nylon 6 matrix and 77% PET reinforcing fiber.

EXAMPLE 4

Composite from a Nonwoven Fabric made from Bicomponent Filaments

The bicomponent yarn is produced by the method described in Example 1. A nonwoven fabric is then produced by laying down multiple ends of yarn in a circular pattern onto a belt, then bonding the filaments together through the application of heat. The resulting nonwoven fabric is anisotropic and has a fabric weight of 195 grams/m². Twenty layers of fabric are stacked together and molded in a hydraulic press at 470° F. (243° C.) and 21 bar (300 psig) for 30 minutes. The resulting composite material is approximately 23% nylon 6 matrix and 77% PET reinforcing fiber.

What is claimed is:

1. A process for forming fiber reinforced laminates comprising:
   extruding a multicomponent yarn having in the same threadline a fibrous matrix thermoplastic component with a first melting point if crystalline or a first softening point if not crystalline, and a drawable fibrous reinforcing thermoplastic component with a second melting point if crystalline or a second softening point if not crystalline, wherein said first melting point or said first softening point is at least 5° C. below said second melting point or said second softening point;
   fabricating the yarn into a pre-consolidation fabric;
   shaping the pre-consolidation fabric by conforming the fabric onto a mold or substrate; and
   heating the shaped pre-consolidation fabric to the first melting or softening point but not to the second melting or softening point such that the matrix component melts and consolidates the reinforcing component.

2. The process of claim 1 wherein said extruding is by melt spinning of a bicomponent fiber integrally comprised of said reinforcing component and said matrix component.

3. The process of claim 2 wherein said bicomponent fiber has a core of said reinforcing component and a sheath of said matrix component.

4. The process of claim 2 wherein said bicomponent fiber is a side-by-side bicomponent.

5. The process of claim 2 wherein said bicomponent fiber is an islands-in-the-sea bicomponent with said reinforcing component as the sea and said matrix component as the sheath.

6. The process of claim 1 wherein said extruding is by co-spinning monocomponent fibers of the matrix component and monocomponent fibers of the reinforcing component into a mixed filament yarn.

7. The process of claim 1 wherein said extruding is by co-spinning bicomponent fiber of said matrix and said reinforcing component and monocomponent fibers of said matrix component, said reinforcing component, or both.

8. The process of claim 1 wherein said fabricating is by knitting.

9. The process of claim 1 wherein said fabricating is by weaving.

10. The process of claim 1 wherein said fabricating is by chemically, mechanically or thermally bonding said fiber into a nonwoven web.

11. The process of claim 1 wherein said fabricating is by wrapping or braiding said fiber about a predetermined form.

12. The process of claim 1 wherein said extruding is uniform such that there are substantially no domains of any one component.

13. The process of claim 1 wherein said extruding is by melt spinning the reinforcing component and the matrix component in the same threadline.

14. The process of claim 1 further comprising drawing the extruded threadline.

15. The process of claim 1 wherein said extruding is of a matrix component selected from the group consisting of:
   polyolefins; polyamides; polyesters; polysulfones; polyaryletherketones; polyimides; polystyrenes; polylactones; polycarbonates; and polyethers.

16. The process of claim 15 wherein said extruding is of a reinforcing component selected from the group consisting of:
   polyolefins; polyamides; polyesters; polysulfones; polyaryletherketones; polyimides; polycarbonates; and polyethers.

* * * * *